United States Patent
Yu et al.

(10) Patent No.: US 10,817,032 B2
(45) Date of Patent: Oct. 27, 2020

(54) DISPLAY-CAMERA INTEGRATED APPARATUS

(71) Applicant: Lenovo (Beijing) Co., Ltd., Beijing (CN)

(72) Inventors: Zhou Yu, Beijing (CN); Zhihu Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/920,798

(22) Filed: Mar. 14, 2018

(65) Prior Publication Data

US 2018/0373298 A1    Dec. 27, 2018

(30) Foreign Application Priority Data

Jun. 27, 2017    (CN) .......................... 2017 1 0502242

(51) Int. Cl.
| | |
|---|---|
| *G06F 1/16* | (2006.01) |
| *G02F 1/1333* | (2006.01) |
| *G02F 1/133* | (2006.01) |
| *G02F 1/1335* | (2006.01) |
| *G02F 1/1368* | (2006.01) |

(52) U.S. Cl.
CPC ........ *G06F 1/1686* (2013.01); *G02F 1/13318* (2013.01); *G02F 1/133308* (2013.01); *G02F 1/1368* (2013.01); *G02F 1/133514* (2013.01); *G02F 1/133528* (2013.01); *G02F 2001/133331* (2013.01); *G06F 1/1616* (2013.01)

(58) Field of Classification Search
CPC .... G06F 1/1686; G06F 1/1616; G06F 1/1605; G02F 1/133514; H01L 27/3234
See application file for complete search history.

(56) References Cited

U.S. PATENT DOCUMENTS

| | | | | |
|---|---|---|---|---|
| 9,806,219 | B2 * | 10/2017 | Benson | ................ G06F 1/1643 |
| 2005/0285973 | A1 * | 12/2005 | Singh | ............... H01L 27/14618 |
| | | | | 348/374 |
| 2008/0303777 | A1 * | 12/2008 | Inoue | .................. G02B 3/0056 |
| | | | | 345/102 |
| 2011/0051360 | A1 * | 3/2011 | Dabov | ................. G06F 1/1626 |
| | | | | 361/679.55 |
| 2012/0105400 | A1 * | 5/2012 | Mathew | ............... H04N 5/2251 |
| | | | | 345/207 |
| 2012/0106063 | A1 * | 5/2012 | Mathew | ............ G02F 1/133528 |
| | | | | 361/679.21 |
| 2012/0206669 | A1 * | 8/2012 | Kim | ...................... G02F 1/1339 |
| | | | | 349/58 |

(Continued)

FOREIGN PATENT DOCUMENTS

| | | |
|---|---|---|
| CN | 101424802 A | 5/2009 |
| CN | 101750695 A | 6/2010 |

(Continued)

*Primary Examiner* — Daniel P Wicklund
*Assistant Examiner* — Christopher L Augustin
(74) *Attorney, Agent, or Firm* — Anova Law Group, PLLC

(57) ABSTRACT

An apparatus includes a display panel and a camera. The display panel includes an accommodation portion. The accommodation portion is at an edge of the display panel and in a non-display region of the display panel. The camera is in the accommodating portion. The camera collects ambient light transmitted through the display panel.

10 Claims, 2 Drawing Sheets

(56) References Cited

U.S. PATENT DOCUMENTS

| | | | |
|---|---|---|---|
| 2013/0016267 A1* | 1/2013 | Ko | G06F 1/1686 |
| | | | 348/333.01 |
| 2013/0033581 A1* | 2/2013 | Woo | H04N 5/2257 |
| | | | 348/47 |
| 2014/0118826 A1* | 5/2014 | Jiao | G02B 5/30 |
| | | | 359/491.01 |
| 2014/0218602 A1 | 8/2014 | Kim et al. | |
| 2014/0225131 A1* | 8/2014 | Benson | G06F 1/1643 |
| | | | 257/82 |
| 2014/0267990 A1* | 9/2014 | Moon | G06F 1/1626 |
| | | | 349/122 |
| 2015/0261033 A1* | 9/2015 | Shin | H05K 5/0086 |
| | | | 349/58 |
| 2016/0338188 A1* | 11/2016 | Dighde | H05K 1/028 |
| 2017/0026553 A1* | 1/2017 | Lee | G02F 1/133512 |
| 2017/0068287 A1* | 3/2017 | Jung | G06F 1/1686 |
| 2017/0123454 A1* | 5/2017 | Evans, V | H04N 5/2258 |
| 2017/0160766 A1* | 6/2017 | Gupta | G06F 1/1605 |
| 2017/0187934 A1* | 6/2017 | Kwak | G06F 1/1605 |
| 2017/0287992 A1* | 10/2017 | Kwak | G06F 3/041 |
| 2017/0289324 A1* | 10/2017 | Yeo | G03B 29/00 |
| 2017/0351164 A1* | 12/2017 | Kim | G03B 17/08 |
| 2019/0258112 A1* | 8/2019 | Nagasaki | G02F 1/13 |

FOREIGN PATENT DOCUMENTS

| | | |
|---|---|---|
| CN | 103974004 A | 8/2014 |
| CN | 106843389 A | 6/2017 |

\* cited by examiner

DISPLAY-CAMERA INTEGRATED APPARATUS

CROSS-REFERENCE TO RELATED APPLICATION

This application claims priority to Chinese Patent Application No. 201710502242.4, filed on Jun. 27, 2017, the entire contents of which are incorporated herein by reference.

TECHNICAL FIELD

The present disclosure generally relates to the field of electronic devices and, more particularly, to a display-camera integrated apparatus.

BACKGROUND

Manufacturers begin to reduce widths of bezels in display panels for use in notebook computers with narrow bezels. Because a camera is usually arranged in a bezel above the screen, also referred to as "an upper bezel," a width of the upper bezel is subject to a restriction of a size of the camera, and thus the width of the upper bezel is at least approximately 5 mm. Accordingly, an extremely narrow bezel cannot be achieved. In conventional technologies, in order to further reduce the width of an upper bezel, the camera is moved to a bezel below the screen, also referred to as "a lower bezel." However, when the user uses the notebook computer in a normal posture, the position of the camera is relatively low, such that images or videos are captured at a low shooting angle. The low shooting angle causes a poor performance in terms of aesthetic appearance of a face. For example, displayed nostrils may appear to be relatively large, etc. Further, when the user uses the keyboard, user hands enter an imaging range of the camera, thus blocking normal display of the face and causing a relatively poor user experience.

SUMMARY

In one aspect, the present disclosure provides an apparatus including a display panel and a camera. The display panel includes an accommodation portion. The accommodation portion is at an edge of the display panel and in a non-display region of the display panel. The camera is in the accommodating portion. The camera collects ambient light transmitted through the display panel.

BRIEF DESCRIPTION OF THE FIGURES

The following drawings are merely examples for illustrative purposes according to various disclosed embodiments and are not intended to limit the scope of the present disclosure.

Figure 1:
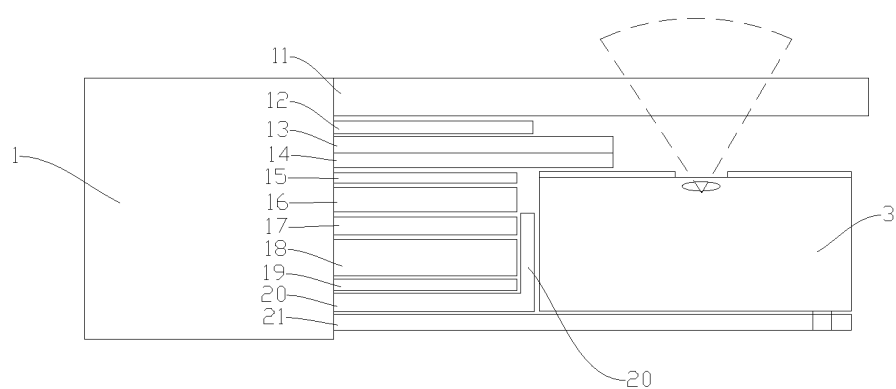
FIG. 1 is a schematic structural diagram of an example of apparatus integrating a display and a camera consistent with various disclosed embodiments.

Reference numerals used in the drawings include: 1, display region; 11, protection glass; 12, outer polarizer; 13, color filter (CF) glass; 14, thin-film-transistor (TFT) glass; 15, inner polarizer; 16, prism sheet; 17, diffusion sheet; 18, light guide plate; 19, reflection sheet; 20, connector; 21, flexible printed circuit (FPC); 3, camera; and 4, bezel.

DETAILED DESCRIPTION OF EMBODIMENTS

Embodiments of the disclosure will now be described in more detail with reference to the drawings. It is to be noted that, the following descriptions of some embodiments are presented herein for purposes of illustration and description only, and are not intended to be exhaustive or to limit the scope of the present disclosure.

The aspects and features of the present disclosure can be understood by those skilled in the art through the embodiments of the present disclosure further described in detail with reference to the accompanying drawings.

Figure 2:
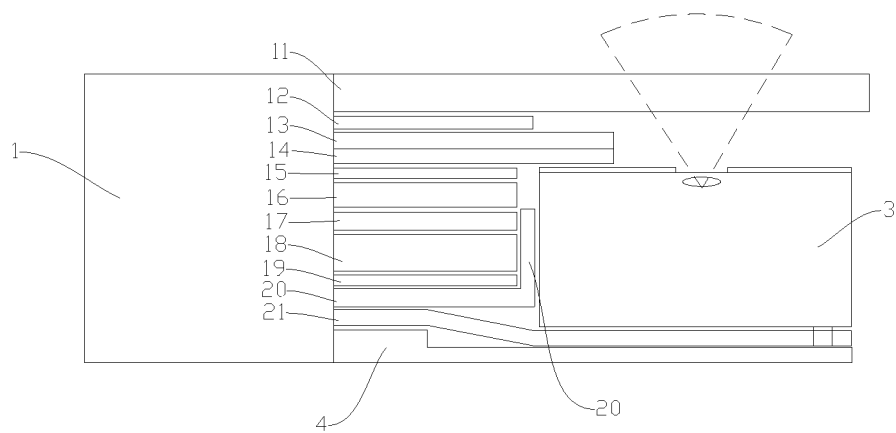
FIG. 2 is a schematic structural diagram of another example of apparatus integrating a display and a camera consistent with various disclosed embodiments.
Figure 3:
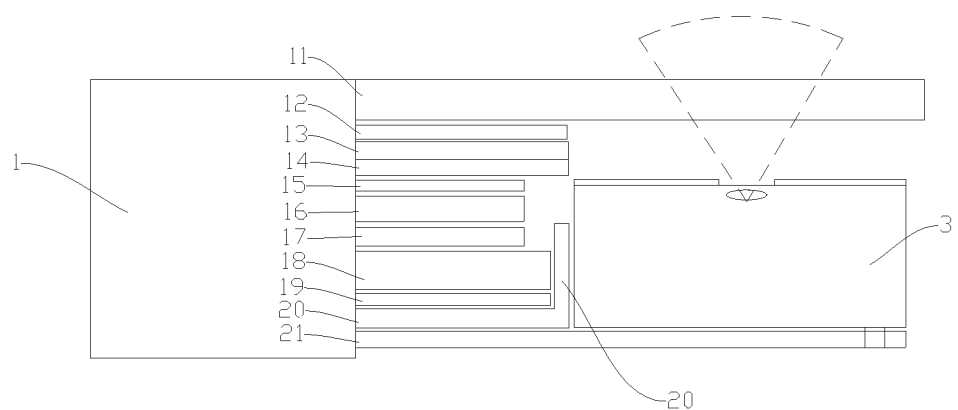
FIG. 3 is a schematic structural diagram of another example of apparatus integrating a display and a camera consistent with various disclosed embodiments.

The present disclosure provides an apparatus integrating a display and a camera, also referred to as a display-camera integrated (DCI) apparatus, for use in an electronic device. FIGS. 1 to 3 are schematic structural diagrams of examples of apparatus integrating a display and a camera consistent with disclosed embodiments. As shown in FIGS. 1 to 3, the DCI apparatus includes a display panel and a camera 3. An edge of the display panel includes an accommodation portion. The accommodation portion is arranged in a non-display region of the display panel. The camera 3 is arranged in the accommodation portion, and the camera 3 can collect ambient light transmitted through the display panel. The electronic device may include, for example, a notebook computer screen, a television screen, or the like. For example, a notebook computer screen, i.e., the display screen of a notebook computer, usually may have displaying and photographing functions, i.e., including the display panel and the camera 3. Further, the display panel and the camera 3 may both be fixed by a bezel(s) 4 of the notebook computer screen. In some embodiments, a structure of the non-display region of the display panel, e.g., a bezel region at an edge of the display region 1, may be configured to combine with the camera 3, such that a width(s) of the bezel(s) 4 of the notebook computer screen can be reduced without affecting a display function of the display panel and a photographing function of the camera 3. Thus, a screen-to-body ratio can be increased.

As shown in FIGS. 1 to 4, the DCI apparatus further includes a connector 20. A portion of the connector 20 is arranged between the display panel and the camera 3 to connect the display panel with the camera 3. The connector 20 is also configured to fix the DCI apparatus in the bezel 4 of the notebook computer screen. In some embodiments, the connector 20 not only provides a reliable connection between the display panel and the camera 3, but also eliminates a need to additionally configure other connecting structures for fixing the camera 3 in the bezel 4 of the notebook computer screen, such that the bezel 4 of the notebook computer screen has a relatively neat and compact structure.

In some embodiments, the display panel may include, for example, a liquid crystal display panel. As shown in the figures, the liquid crystal display panel includes a protection glass 11, an outer polarizer 12, a color filter (CF) glass 13, a thin-film-transistor (TFT) glass 14, an inner polarizer 15, a prism sheet 16, a diffusion sheet 17, a light guide plate 18, and a reflection sheet 19 sequentially arranged from outside to inside of the display panel. Further, a groove is formed from a side to an interior of the display panel, and the groove forms the accommodation portion. As shown in FIGS. 1 and 2, in order to reduce an influence of the camera 3 on the display region 1 of the display panel, the accommodation portion is formed at an inner side of the TFT glass 14, i.e., behind the TFT glass 14. Further, in order to provide a sufficient installation space for the camera 3, as shown in FIG. 1, the groove having a depth of, e.g., approximately 2.3 mm, is formed over the inner polarizer 15, the prism sheet 16, the diffusion sheet 17, the light guide plate 18, and the reflection sheet 19. In FIGS. 1-3, the DCI apparatus is shown in a "laid-down" state as compared to the "upright" state shown in FIG. 4. That is, in the examples shown in FIGS. 1-3, the upward direction of the DCI apparatus is shown towards the right of the figures. Therefore, in the present disclosure, when one component, such as the accommodation portion or the camera 3 is referred to as being "over" one or more of other components of the DCI apparatus, such as the outer polarizer 12, the color filter (CF) glass 13, the thin-film-transistor (TFT) glass 14, the inner polarizer 15, the prism sheet 16, the diffusion sheet 17, the light guide plate 18, the reflection sheet 19, and/or the connector 20, it refers to the one component being over the one or more other components in the "upright" state, i.e., the one component is to the right of the one or more other components as in the "laid-down" state shown in FIGS. 1-3.

As shown in FIGS. 1-3, a portion of the connector 20 is arranged at an inner side of, i.e., behind, the reflection sheet 19, and is connected to the display panel. Another portion of the connector 20 is bent into the groove and connected to the camera 3. Further, for convenient installation of the camera 3, a positioning slot (not shown) may be provided at a portion of the connector 20 that is connected to the camera 3, such that the camera 3 can be installed at a correct position to have a reliable connection with the display panel. In some embodiments, as shown in FIGS. 1-3, the display panel further includes a circuit connecting plate electrically coupling the camera 3 and internal electrical components of the notebook computer, such as a circuit board. The circuit connecting plate can include, for example, a flexible printed circuit (FPC) 21, which has a relatively high reliability, a relatively high wiring density, a relatively small thickness, and certain hardness and flexibility. Using the FPC 21 to electrically couple the camera 3 with the internal electrical components can further increase a connection reliability of the camera 3. In some embodiments, a positioning protrusion (not shown in the figures) is provided at the rear side of the camera 3, and a positioning indentation (not shown in the figures) matching the positioning protrusion is provided on the FPC 21, so as to further improve the connection stability of the camera 3 and prevent the connection from being loosened by external forces. Further, the camera 3 as a whole is located behind the protection glass 11, and thus there is no need to provide a separate protection glass for protecting a lens of the camera 3.

In some scenarios, the camera 3 may have a relatively large thickness. Therefore, in order to provide a sufficient installation space, as shown in FIG. 2, the portion of the FPC 21 that is connected to the camera 3 is bent backward, and aligned with a rear portion of the camera 3. In order to further improve a connection strength, the FPC 21 can be securely connected to the connector 20. Various approaches can be adopted to connect the FPC 21 to the connector 20, such as welding, cementing, or connecting through other connector(s), which are not restricted in the present disclosure, and may be chosen according to various application scenarios. In addition, the position of the accommodation portion, e.g., the groove, may be adjusted according to various application scenarios. The accommodation portion may be formed over at least one component located at an inner side of the TFT glass 14 and may extend to the TFT glass 14. For example, when the camera 3 has a relatively small thickness, the accommodation portion, e.g., the groove, may be formed over the inner polarizer 15, the prism sheet 16, the diffusion sheet 17, and the light guide plate 18 to form an accommodation portion that matches the thickness of the camera 3, i.e., an accommodation portion that can accommodate the entire thickness of the camera 3, or may be formed over the inner polarizer 15, the prism sheet 16, and the diffusion sheet 17.

As shown in FIG. 3, in some embodiments, the accommodation portion is formed at the inner side of, i.e., behind, the protection glass 11. Further, in order to provide a sufficient installation space for the camera 3, the groove with a depth of, e.g., approximately 1.8 mm, is provided over the outer polarizer 12, the CF glass 13, the TFT glass 14, the inner polarizer 15, the prism sheet 16, the diffusion sheet 17, the light guide plate 18, and the reflection sheet 19. In actual fabrications, the groove may not need to be machined using a cutting tool. In some embodiments, the groove may be formed by, for example, uneven arrangements of edges of various plate-shaped layers of the display panel, such as one or more of the outer polarizer 12, the CF glass 13, the TFT glass 14, the inner polarizer 15, the prism sheet 16, the diffusion sheet 17, the light guide plate 18, and the reflection sheet 19. Different components can be used and/or processed according to sizes of the groove to meet corresponding needs. In addition, the position of the accommodation portion, e.g., the groove, may be adjusted according to various application scenarios. The accommodation portion may be formed over at least one component located at an inner side of the protection glass 11 and may extend to the TFT glass 14. For example, when the camera 3 has a relatively small thickness, the accommodation portion, e.g., the groove, may be formed over the outer polarizer 12, the CF glass 13, the TFT glass 14, the inner polarizer 15, the prism sheet 16, the diffusion sheet 17, and the light guide plate 18 to form an accommodation portion matching the thickness of the camera 3, or may be formed over the outer polarizer 12, the CF glass 13, the TFT glass 14, the inner polarizer 15, the prism sheet 16, and the diffusion sheet 17. The position of the accommodation portion is not restricted in the present disclosure, and may be chosen according to various application scenarios. Further, in some embodiments, in order to provide a wiring region(s), edges of the inner polarizer 15, the prism sheet 16, and the diffusion sheet 17 are narrowed, e.g., shortened, inwardly to form the wiring region(s), as shown in FIG. 3.

Figure 4:
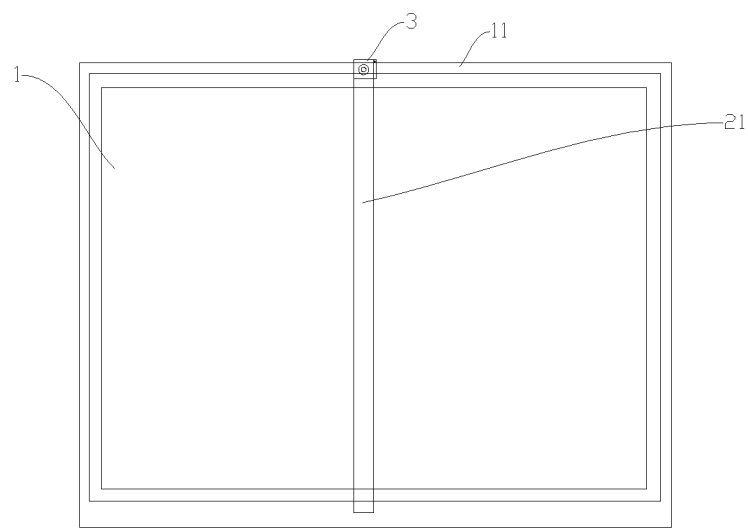
FIG. 4 is a schematic front structural view of an example of apparatus integrating a display and a camera consistent with various disclosed embodiments.

The present disclosure also provides a display device. The display device may include one or more bezels and a DCI apparatus consistent with the disclosure, such as one of the above-described example DCI apparatuses. The bezels may cover edges of the display panel, and a through hole corresponding to the camera 3 may be formed at the bezel. The connector 20 may be provided with a connection structure for fixing the DCI apparatus with the bezels. Various other approaches may be adopted to fix the DCI apparatus with the bezels, which are not restricted in the present disclosure. Further, because the width of the non-display region in the display panel is relatively small, a portion of the camera 3 may protrude from an edge of the display panel. Accordingly, a hollow protrusion may be correspondingly formed at a top portion of the bezel, e.g., a top portion of an upper bezel, of the display device to accommodate the camera 3. In some embodiments, the camera 3 may be arranged in an upper bezel of the display device. In order to further reduce the space at the upper bezel needed by the camera 3, one end of the FPC 21 may be connected to the camera 3, and the other end of the FPC 21 may extend downwards on the back of the display panel, and connect to a connection end at a lower bezel, as shown in FIG. 4, so as to avoid the need to dispose a corresponding connection end at the upper bezel. Accordingly, space may be saved.

The present disclosure provides an apparatus integrating a display and a camera. The apparatus may include a display panel and a camera. An edge of the display panel may be provided with an accommodation portion, and the accommodation portion may be arranged in a non-display region of the display panel. The camera may be arranged in the accommodation portion, and the camera can collect external light transmitted through the display panel. In the apparatus of the disclosure, the display panel may have an optimized structure and may be combined with the camera, thereby reducing a distance between a display region of the display panel and the camera, and reducing a bezel width of a display device containing the apparatus.

The foregoing description of the embodiments of the disclosure has been presented for purposes of illustration and description. It is not intended to be exhaustive or to limit the disclosure to the precise form or to example embodiments disclosed. Accordingly, the foregoing description should be regarded as illustrative rather than restrictive. Obviously, many modifications and variations will be apparent to persons skilled in this art. The embodiments are chosen and described in order to explain the principles of the technology, with various modifications suitable to the particular use or implementation contemplated. It is intended that the scope of the invention be defined by the claims appended hereto in which all terms are meant in their broadest reasonable sense unless otherwise indicated. Therefore, the term "the disclosure," "the present disclosure," or the like does not necessarily limit the claim scope to a specific embodiment, and the reference to example embodiments of the disclosure does not imply a limitation on the invention, and no such limitation is to be inferred. Moreover, the claims may refer to "first," "second," etc., followed by a noun or element. Such terms should be understood as a nomenclature and should not be construed as giving the limitation on the number of the elements modified by such nomenclature unless specific number has been given. Any advantages and benefits described may or may not apply to all embodiments of the disclosure. It should be appreciated that variations may be made to the embodiments described by persons skilled in the art without departing from the scope of the present disclosure. Moreover, no element or component in the present disclosure is intended to be dedicated to the public regardless of whether the element or component is explicitly recited in the following claims.

What is claimed is:

1. An apparatus comprising:
    a display panel including:
        an accommodation portion, the accommodation portion being at an edge of the display panel and in a non-display region of the display panel; and
        a plurality of layers including a protection glass layer, an outer polarizer layer, a color filter glass layer, a thin-film-transistor glass layer, an inner polarizer layer, a player of a prism sheet layer, a diffusion sheet layer, a light guide plate layer, and a reflection sheet layer sequentially arranged from outside to inside of the display panel;
    a camera in the accommodation portion, wherein the camera collects ambient light transmitted through the display panel;
    a circuit connecting plate electrically coupling the camera to an electrical component of an electronic device including the apparatus; and
    a connector including a first portion in the accommodation portion and a second portion not in the accommodation portion, the first portion of the connector being arranged between the display panel and the camera to connect the display panel to the camera, and the second portion being arranged between the display panel and the circuit connecting plate,
    wherein
        the protection glass layer extends over the accommodation portion to fully cover over the camera;
        both the color filter glass layer and the thin-film-transistor glass layer extend to the accommodation portion to partially cover over the camera and not cover a lens hole of the camera; and
        the outer polarizer layer, the inner polarizer layer, the prism sheet layer, the diffusion sheet layer, the light guide plate layer, and the reflection sheet layer are arranged outside of the accommodation portion without covering a portion of the camera.

2. The apparatus according to claim 1, wherein:
    the connector fixes the apparatus with another portion of the electronic device including the apparatus.

3. The apparatus according to claim 1, wherein:
    the accommodation portion includes a groove formed from a side to an interior of the display panel.

4. The apparatus according to claim 3, wherein the lens hole of the camera is oriented toward the protection glass.

5. The apparatus according to claim 3, wherein:
    the camera is arranged at a rear side of the thin-film-transistor glass layer opposite to a front side of the thin-film-transistor glass layer; and
    the rear side of the thin-film-transistor glass layer is further away from the protecting glass layer than the front side of the thin-film-transistor glass layer.

6. The apparatus according to claim 3, wherein:
    the second portion of the connector is arranged between the reflection sheet layer and the circuit connecting plate.

7. A display device comprising:
    a bezel; and
    the apparatus according to claim 1,
    wherein:
        the bezel covers the edge of the display panel, and
        the bezel includes a through hole corresponding to the camera.

8. The display device according to claim 7, wherein:
    the bezel is an upper bezel of the display device, and
    the camera is arranged in the upper bezel.

9. The display device according to claim 8, wherein:
    the upper bezel includes a hollow protrusion formed at a top portion of the upper bezel, and
    the camera is arranged in the protrusion.

10. The apparatus according to claim 1, wherein:
    the second portion of the connector, at least partially, is fixedly connected to the circuit connecting plate.

\* \* \* \* \*